(12) United States Patent
Yoshida et al.

(10) Patent No.: US 8,295,695 B2
(45) Date of Patent: Oct. 23, 2012

(54) LENS BARREL, CAMERA MODULE, AND IMAGING APPARATUS

(75) Inventors: Kyosuke Yoshida, Tokyo (JP); Yasutaka Takahashi, Chiba (JP); Fumihiko Fujishiro, Ibaraki (JP)

(73) Assignee: Sony Corporation (JP)

( * ) Notice: Subject to any disclaimer, the term of this patent is extended or adjusted under 35 U.S.C. 154(b) by 96 days.

(21) Appl. No.: 12/804,155

(22) Filed: Jul. 15, 2010

(65) Prior Publication Data
US 2011/0044679 A1 Feb. 24, 2011

(30) Foreign Application Priority Data

Aug. 18, 2009 (JP) ................................ P2009-189589

(51) Int. Cl.
*G03B 3/10* (2006.01)
(52) U.S. Cl. ........................................ 396/133; 359/824
(58) Field of Classification Search .................. 359/824; 396/133
See application file for complete search history.

(56) References Cited

U.S. PATENT DOCUMENTS

| 7,391,579 B2 * | 6/2008 | Ho et al. | 359/696 |
| 7,576,455 B2 * | 8/2009 | Ho et al. | 310/10 |
| 7,589,922 B2 * | 9/2009 | Higuchi | 359/824 |
| 7,675,565 B2 * | 3/2010 | Cheng | 348/357 |
| 7,986,873 B2 * | 7/2011 | Ishihara et al. | 396/55 |
| 8,072,099 B2 * | 12/2011 | Chou | 310/12.16 |
| 2006/0257131 A1 * | 11/2006 | Yoon et al. | 396/133 |
| 2007/0268601 A1 * | 11/2007 | Yu | 359/819 |

FOREIGN PATENT DOCUMENTS

JP  2007-108595 A  4/2007
* cited by examiner

*Primary Examiner* — Clayton E Laballe
*Assistant Examiner* — Leon W Rhodes, Jr.
(74) *Attorney, Agent, or Firm* — Lerner, David, Littenberg, Krumholz & Mentlik, LLP

(57) ABSTRACT

A lens barrel includes: a lens holding member that holds a lens; a drive coil attached to an outer peripheral portion of the lens holding member; a magnet attached to face the drive coil; a barrel member in which the lens holding member is disposed; and a cover member attached to the barrel member with the lens on a light incident side of the lens holding member facing to an outside. The cover member is magnetic, and the magnet is directly attached to the cover member at a position acing the drive coil.

7 Claims, 14 Drawing Sheets

LENS BARREL, CAMERA MODULE, AND IMAGING APPARATUS

CROSS-REFERENCE TO RELATED APPLICATION

The present application claims priority from Japanese Patent Application No. JP 2009-189589 filed in the Japanese Patent Office on Aug. 18, 2009, the entire content of which is incorporated herein by reference.

BACKGROUND OF THE INVENTION

1. Field of the Invention

The present invention relates to a lens barrel for an imaging apparatus incorporated in a small electronic device such as a portable terminal device. More specifically, the present invention related to a lens barrel for an imaging apparatus, a camera module, and an imaging apparatus that use a voice coil motor in a focus drive mechanism.

2. Description of the Related Art

Most imaging apparatuses installed in cellular phone terminals are equipped with an auto-focus function. In order to use the auto-focus function, it is necessary to move a group of optical lenses inside in an optical-axis direction. As a mechanism that drives the group of lenses, voice coil motors in which a drive coil or a magnet is moved through an electromagnetic induction phenomenon caused by a magnetic circuit are widely used.

In many of the voice coil motors in which the drive coil is movable, the drive coil is fixed to the outer peripheral portion of a lens holding member using an adhesive or the like for assembly. Also, the magnet is attached to a fixed portion provided outwardly of the drive coil to face the drive coil.

Thus, the size of the magnet significantly affects the external size of the lens barrel. Therefore, in view of the circumstances in which it is desirable to reduce the size of the entire lens barrel, it may be difficult to secure a space for the magnet. It may also be difficult to secure a space for a yoke, which is used together with the magnet. Reducing the size of the magnet to secure a space for the yoke may reduce the thrust for the lens holding member provided on the side of a movable portion.

Further, it may be necessary that in the case where the cellular phone or the like equipped with the imaging apparatus is subjected to a drop impact, for example, the magnet should not come out of a predetermined position to be caught into the drive coil of the movable portion.

Japanese Unexamined Patent Application Publication No. 2007-108595 is an example of the related art.

SUMMARY OF THE INVENTION

In view of the foregoing, it is desirable to provide a lens barrel, a camera module, and an imaging apparatus with a reduced overall size achieved without reducing the thrust for a lens holding member on the side of a movable portion.

It is also desirable to provide a lens barrel, a camera module, and an imaging apparatus in which a magnet is securely fixed.

According to an embodiment of the present invention, there is provided a lens barrel including: a lens holding member that holds a lens; a drive coil attached to an outer peripheral portion of the lens holding member; a magnet attached to face the drive coil; a barrel member in which the lens holding member is disposed; and a cover member attached to the barrel member with the lens on a light incident side of the lens holding member facing to an outside. The cover member is magnetic, and the magnet is directly attached to the cover member at a position facing the drive coil.

According to another embodiment of the present invention, there is provided a camera module including: a lens holding member that holds a lens; a drive coil attached to an outer peripheral portion of the lens holding member; a magnet attached to face the drive coil; a barrel member in which the lens holding member is disposed; and a cover member attached to the barrel member with the lens on a light incident side of the lens holding member facing to an outside. The cover member is magnetic, and the magnet is directly attached to the cover member at a position facing the drive coil.

According to still another embodiment of the present invention, there is provided an imaging apparatus including: a lens holding member that holds a lens; a drive coil attached to an outer peripheral portion of the lens holding member; a magnet attached to face the drive coil; a barrel member in which the lens holding member is disposed; a cover member attached to the barrel member with the lens on a light incident side of the lens holding member facing to an outside; imaging means for capturing a subject image obtained via the lens; and storage means for storing an imaging signal acquired by the imaging means. The cover member is magnetic, and the magnet is directly attached to the cover member at a position facing the drive coil.

According to the embodiments of the present invention, the cover member is magnetic, and thus functions as a yoke. The magnet is directly attached at a position facing the drive coil. According to the embodiments of the present invention, a yoke which is used in the related art is not necessary, which contributes to reducing the overall size, weight, and cost. In addition, it is possible to increase the size of the magnet and hence the drive force of a voice coil motor.

DESCRIPTION OF THE PREFERRED EMBODIMENTS

A camera module installed in a cellular phone according to an embodiment of the present invention will be described below in the following order with reference to the drawings.
1. Cellular Phone
2. Camera Module
3. Lens Barrel
3-1. Lens Holding Member
3-2. Drive Coil
3-3. Flexible Wiring Circuit Board
3-4. Plate Spring
3-5. Rear Barrel
3-6. Front Barrel
3-7. Cover Member
4. Imaging Element Portion
5. Assembly of Camera Module
6. Operation of Camera Module
7. Effect of Camera Module
8. Modifications (1. Cellular Phone)

Figure 1:
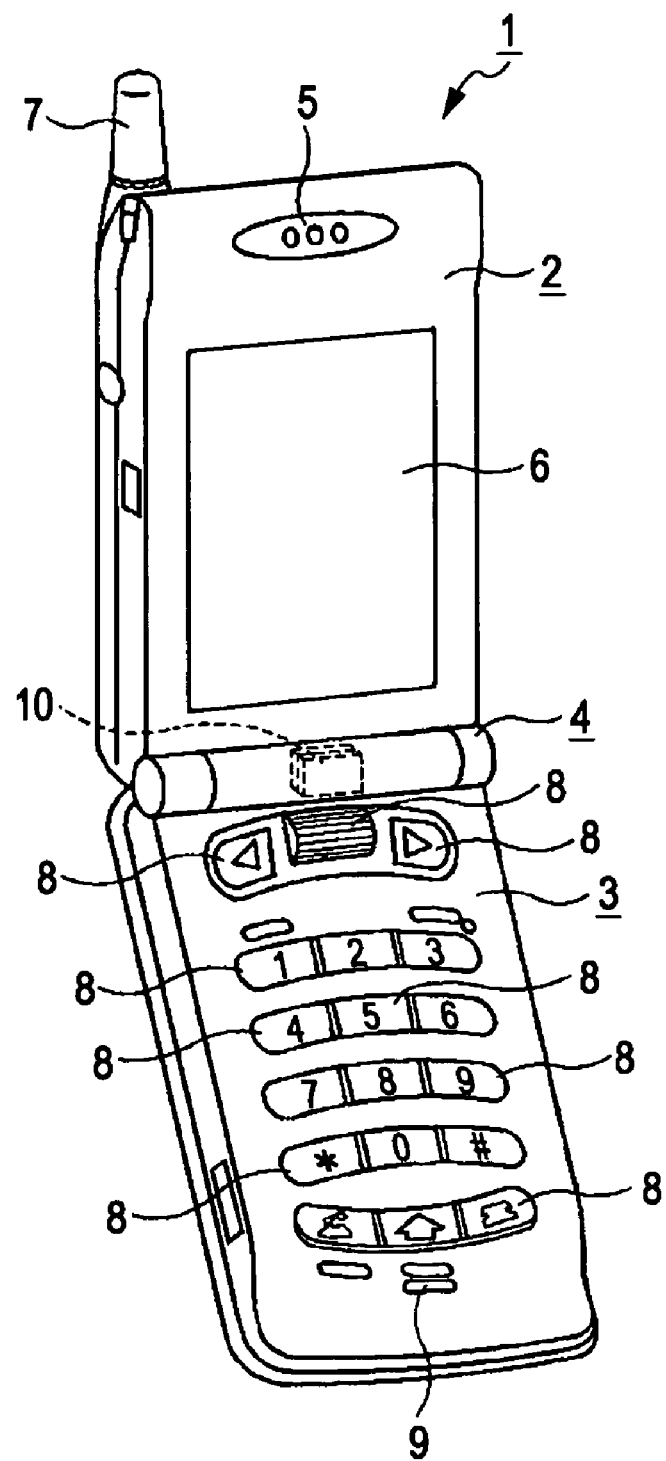
FIG. 1 is a perspective view of a cellular phone.
Figure 2:
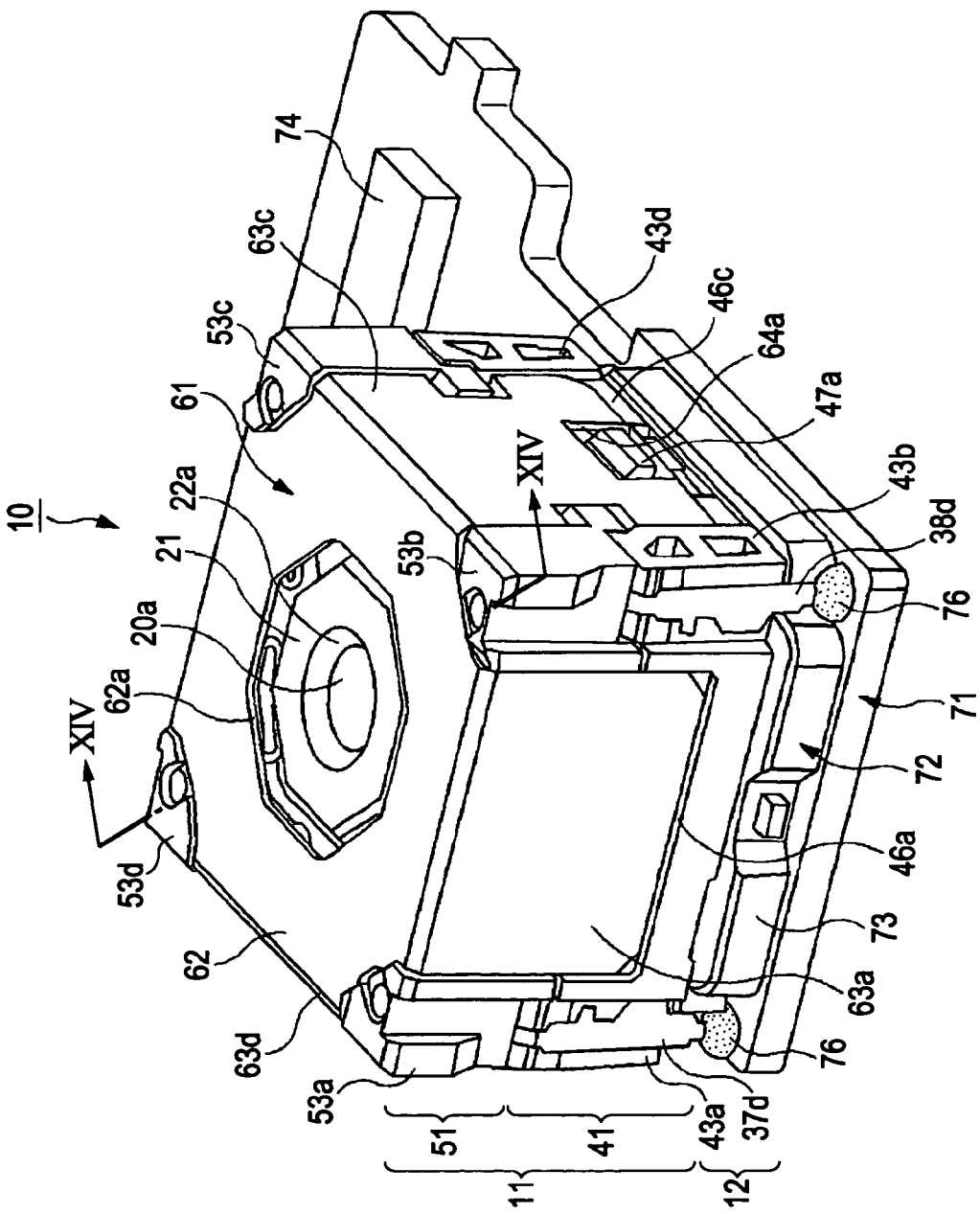
FIG. 2 is a perspective view of a camera module.

As shown in FIG. 1, a cellular phone 1 equipped with a camera module according to an embodiment of the present invention includes a first housing 2 and a second housing 3 coupled with each other via a hinge portion 4 so as to be foldable. The first housing 2 is provided with a speaker 5, a display 6, and an antenna 7. The antenna 7 is expandable/retractable. The second housing 3 is provided with various types of operation portions 8, 8, . . . such as a push button and a rotary dial, and a microphone 9. A camera module 10 is incorporated in the hinge portion 4. A predetermined push button, of the operation portions 8, 8, . . . , is used to capture an image. Pressing the operation portion 8 activates the camera module 10 to capture an image.

The camera module 10 may be provided in the first housing 2 or in the second housing 3, rather than in the hinge portion 4. A single cellular phone 1 may be equipped with a plurality of camera modules 10. That is, the cellular phone 1 is an electronic device that also functions as an imaging apparatus.

(2. Camera Module)

As shown in FIGS. 2 to 5, the camera module 10 includes a lens barrel 11 and an imaging element portion 12. The lens barrel 11 holds a plurality of lenses, and has an auto-focus function for moving the plurality of lenses in an optical-axis direction. The imaging element portion 12 includes a printed wiring circuit board 71 and an imaging element 72 mounted on the printed wiring circuit board 71. The lens barrel 11 is attached to the printed wiring circuit board 71 of the imaging element portion 12 with the optical axis of the lenses of the lens barrel 11 and the imaging element 72 aligned with each other. Power for achieving the auto-focus function is supplied from the printed wiring circuit board 71 to the lens barrel 11.

Figure 5:
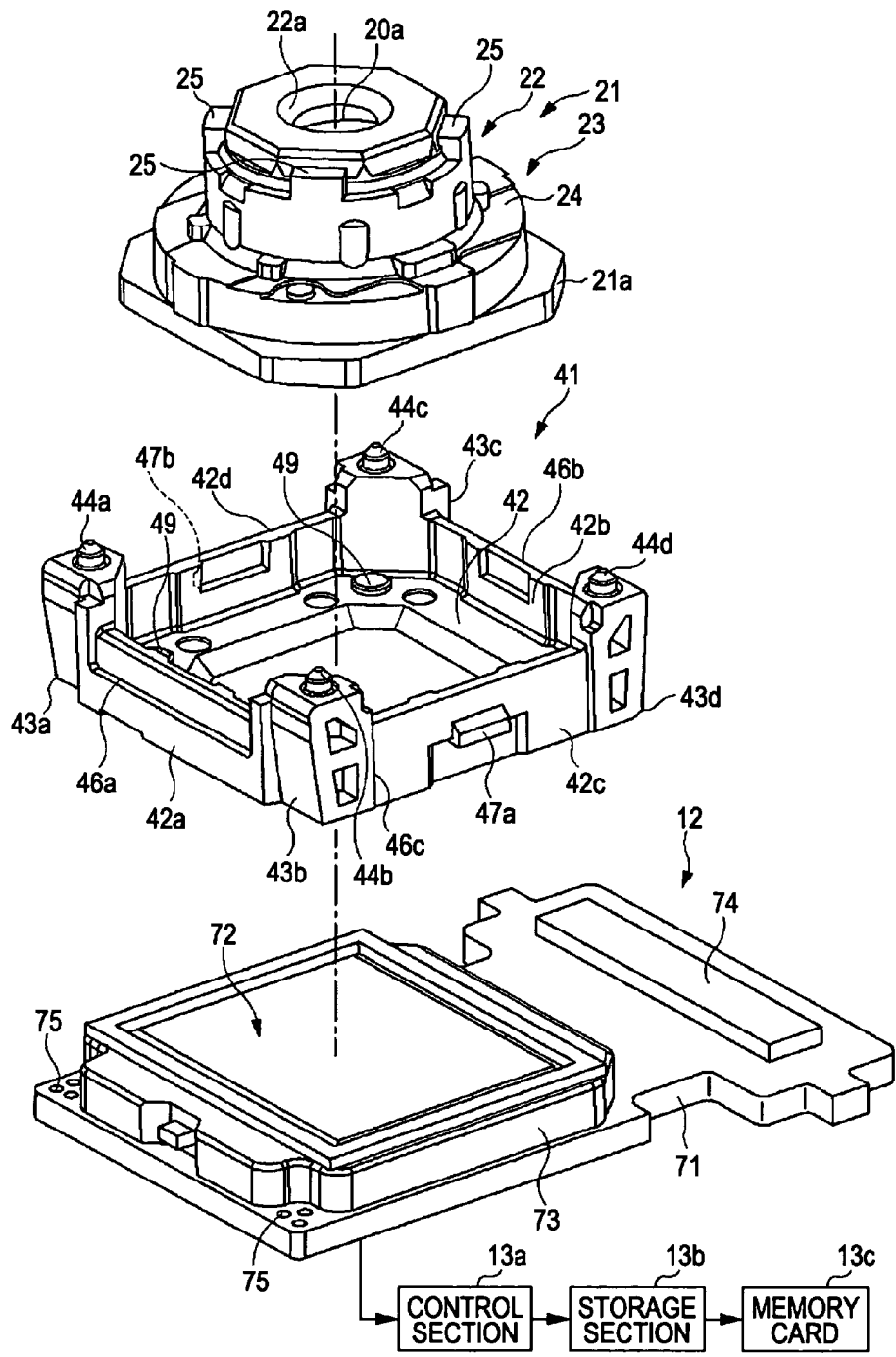
FIG. 5 is a perspective view continuous with FIG. 4, showing a lens holding member, a rear barrel, and a printed wiring circuit board on which an imaging element is mounted.

As shown in FIG. 5, the imaging element 72 of the imaging element portion 12 is connected to a control section 13a that causes the cellular phone 1 to function as an imaging apparatus. The control section 13a is connected to a storage section 13b that stores image data, movie data, sound data, and so forth in a memory card 13c or the like serving as an external storage medium. The control section 13a converts an imaging signal input from the imaging element 72, for example, from an analog signal into a digital signal, and compresses data into a predetermined compression format such as a JPEG format. The control section 13a then causes the storage section 13b to store the compressed image data or the like in the memory card 13c. The external storage medium may be a disk cartridge, an optical disc, or an information processing device such as a computer connected via a network, rather than the memory card 13c. The control section 13a also generates a focus control signal on the basis of an output of the imaging element 72, and supplies a predetermined drive current to a drive coil 26. That is, the control section 13a functions as a signal processing section that stores data in the memory card 13c, and also functions as a camera control section.

(3. Lens Barrel)

As shown in FIGS. 2 to 5, the lens barrel 11 includes a lens holding member 21 that holds the plurality of lenses, and a rear barrel 41 and a front barrel 51 that support the lens holding member 21 so as to be movable in the optical-axis direction.

(3-1. Lens Holding Member)

Figure 6:
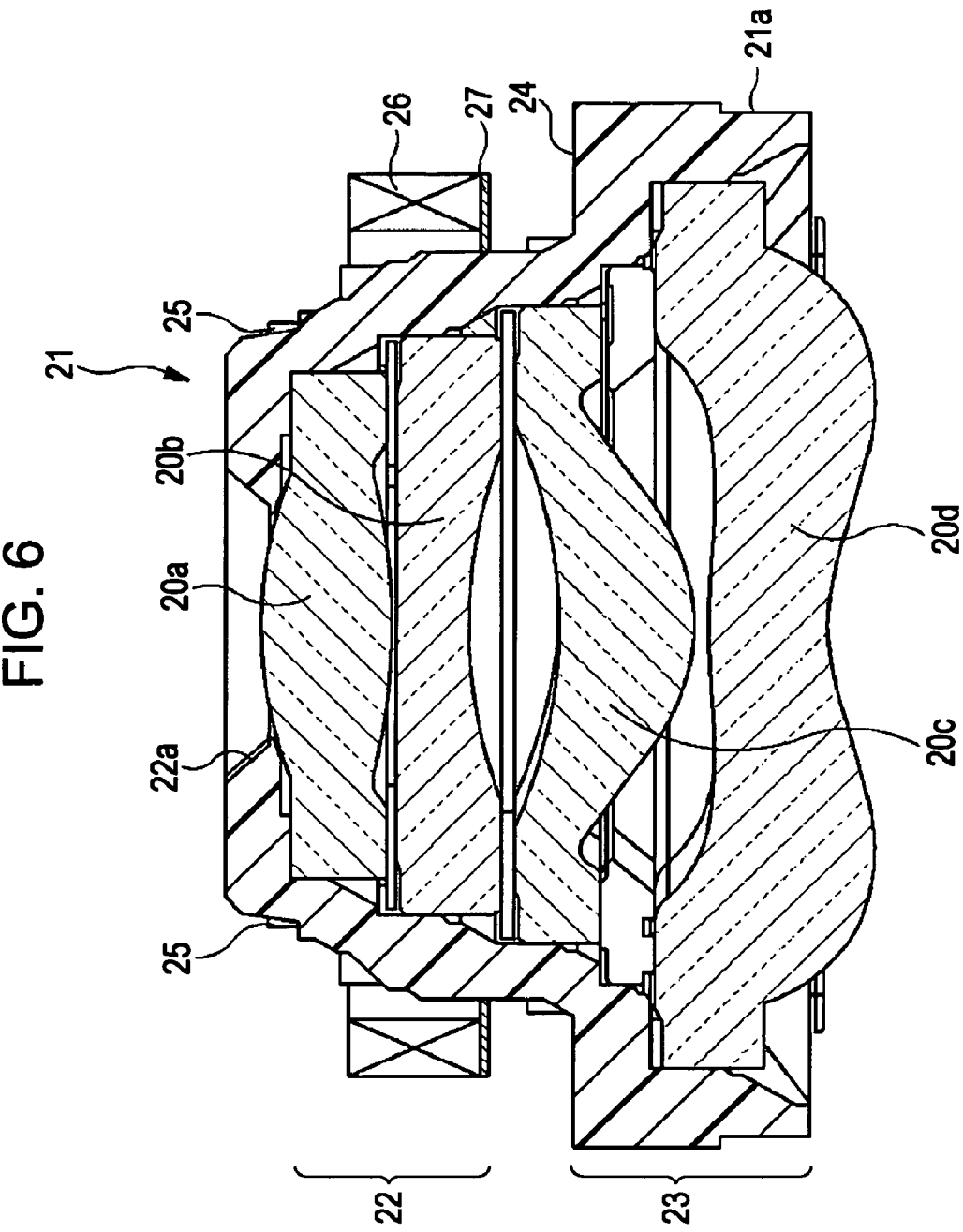
FIG. 6 is a cross-sectional view of the lens holding member.

As shown in FIGS. 5 and 6, the lens holding member 21 includes a first cylindrical portion 22 that holds first to third lenses 20a, 20b, and 20c, and a second cylindrical portion 23 that holds a fourth lens 20d. In the lens holding member 21, the first cylindrical portion 22 and the second cylindrical portion 23 are formed integrally with each other by resin molding, for example.

The camera module 10 according to the embodiment of the present invention uses an imaging element that is higher in resolution than an imaging element according to the related art in order to capture high-quality images and movies compared to images and movies captured using a camera module according to the related art. Accordingly, the fourth lens 20d is additionally provided. The fourth lens 20d is larger in diameter than the first lens 20a, the second lens 20b, and the third lens 20c.

The first cylindrical portion 22 has a generally circular cross section, and holds the first lens 20a, the second lens 20b, and the third lens 20c in this order from the light incident side with the optical axes of the first to third lenses 20a to 20c matching each other. The first lens 20a on the light incident side faces to the outside through a lens opening 22a. The second cylindrical portion 23 has a generally circular cross section, is larger in diameter than the first cylindrical portion 22, and holds the fourth lens 20d with the optical axis of the fourth lens 20d matching the optical axes of the first to third lenses 20a to 20c.

Since the second cylindrical portion 23 is larger in diameter than the first cylindrical portion 22, the outer peripheral portion of the second cylindrical portion 23 swells outwardly of the outer peripheral portion of the first cylindrical portion 22, and the upper surface of the second cylindrical portion 23 serves as a reception portion 24 that receives the drive coil 26 and a plate spring 36.

(3-2. Drive Coil)

Figure 4:
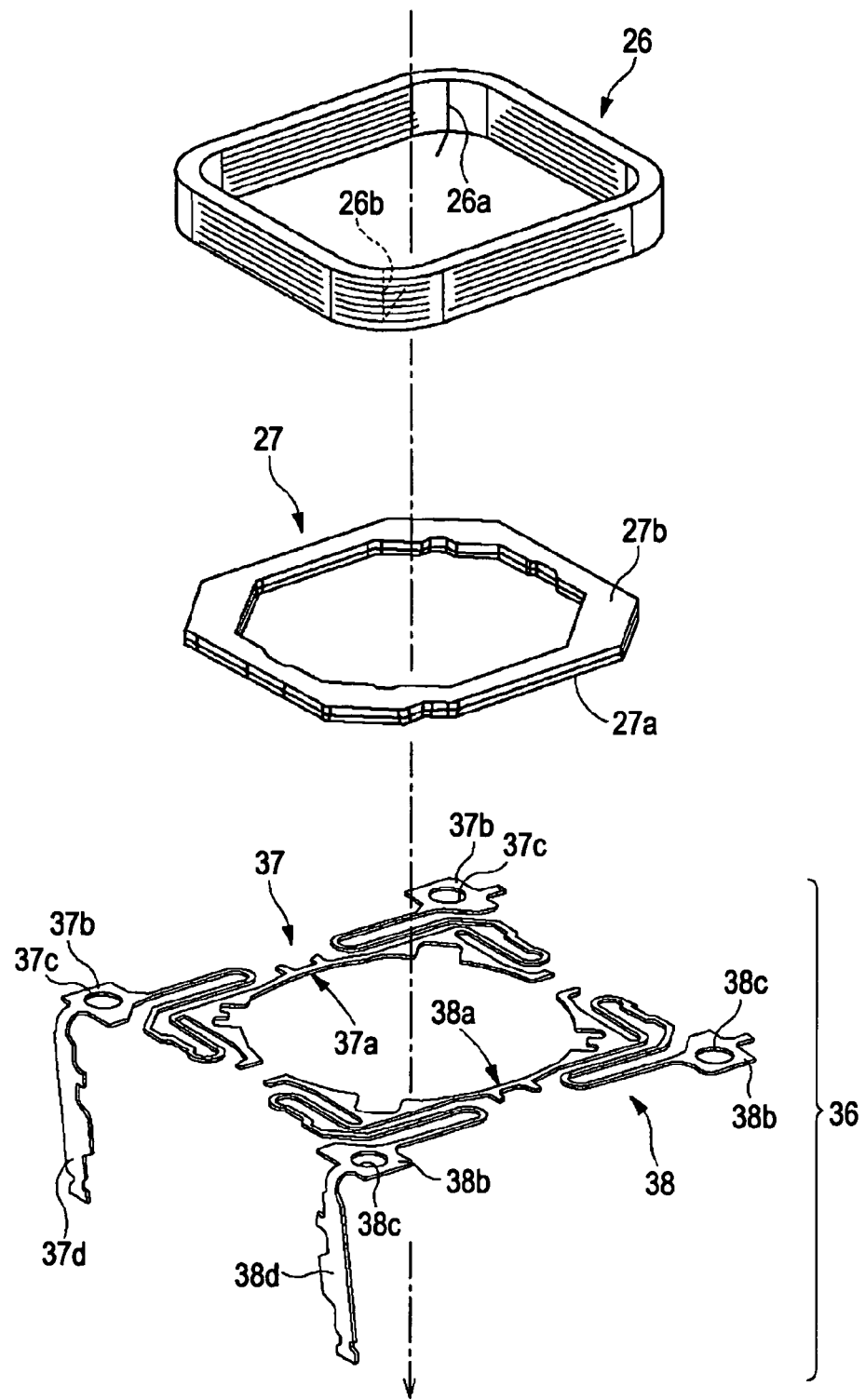
FIG. 4 is a perspective view continuous with FIG. 3, showing a drive coil, a flexible wiring circuit board, and a plate spring.

As shown in FIG. 4, the drive coil 26 is an air-core coil formed by winding a conductor in a generally rectangular shape, and is formed in such a size that the first cylindrical portion 22 of the lens holding member 21 is insertable into the drive coil 26 and the drive coil 26 may be supported by the reception portion 24. That is, the sides of the drive coil 26 are less than the maximum outside diameter of the lens 20d, that is, the outside diameter of the fourth lens 20d, and the diagonals of the drive coil 26 are more than the maximum outside diameter of the lens 20d. The drive coil 26 is disposed around the first cylindrical portion 22, and at least a part of the drive coil 26 is positioned inwardly of the outer periphery of the second cylindrical portion 23. In addition, at least a part of the drive coil 26, for example a part of a side of the drive coil 26, is positioned inwardly of the outer periphery of the lens 20d on the light output side held by the second cylindrical portion 23.

In the drive coil 26, a plus-side wire end 26a is drawn out from the upper side or the middle of one corner portion. Meanwhile, a minus-side wire end 26b is drawn out from the upper side or the middle of a corner portion that is diagonally across the one corner portion from which the plus-side wire end 26a is drawn out. The plus-side wire end 26a and the minus-side wire end 26b are drawn out from the upper side or the middle of the respective corner portions of the drive coil 26 to the lower side (light output side of the lens holding member 21), which contributes to reducing the size of the entire drive coil 26. The drive coil 26 in a generally rectangular shape is attached to the outer peripheral portion of the first cylindrical portion 22 of the lens holding member 21 with a generally circular cross section. Thus, the plus-side wire end 26a and the minus-side wire end 26b pass through voids 30 formed between the drive coil 26 and the first cylindrical portion 22.

Because the plus-side wire end 26a and the minus-side wire end 26b are a thin wire, the plus-side wire end 26a and the minus-side wire end 26b may be drawn out from the upper side or the middle of the outer side of the respective corner portions to the lower side. Alternatively, the plus-side wire end 26a and the minus-side wire end 26b may be drawn out from the lower side of the inner side or the outer side of the respective corner portions.

The drive coil 26 configured as described above is electrically connected to a flexible wiring circuit board 27 disposed below the drive coil 26.

(3-3. Flexible Wiring Circuit Board)

Figure 7:
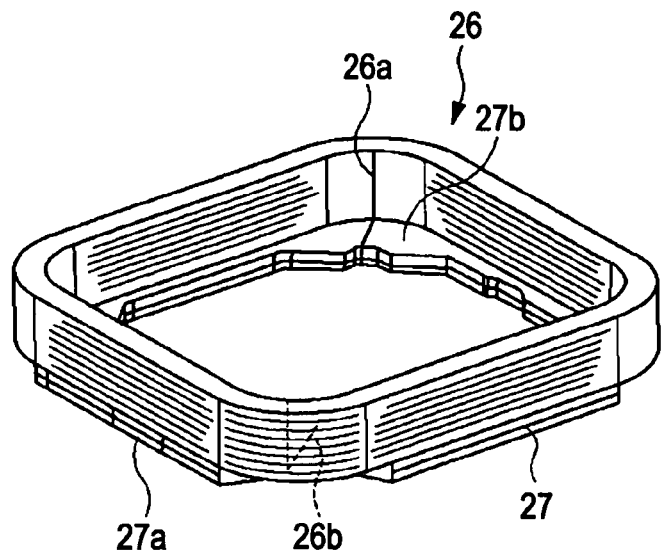
FIG. 7 is a perspective view showing a state in which the flexible wiring circuit board is bonded to the drive coil.

As shown in FIGS. 4 and 7, the flexible wiring circuit board 27 is formed to have generally the same size as the lower surface of the drive coil 26, and to have a generally octagonal external shape obtained by chamfering respective corner portions of a generally rectangular shape corresponding to the drive coil 26. The flexible wiring circuit board 27 has an annular shape with a generally octagonal internal shape such that the first cylindrical portion 22 of the lens holding member 21 is insertable into the flexible wiring circuit board 27.

In the flexible wiring circuit board 27, one surface 27a is formed with a wiring pattern, and the other surface 27b is formed with an insulation layer made of polyimide or the like. The flexible wiring circuit board 27 is fixed to the lower surface of the drive coil 26 using an adhesive or the like with the other surface 27b formed with an insulation layer on the drive coil 26 side for electrical insulation from the drive coil 26.

In the wiring pattern formed on the one surface 27a, a plus-side pattern to be electrically connected to the plus-side wire end 26a of the drive coil 26 and a minus-side pattern to be electrically connected to the minus-side wire end 26b of the drive coil 26 are formed separately from each other. The plus-side wire end 26a drawn out from the inner side of the drive coil 26 is electrically connected to the plus-side pattern using solder, a conductive adhesive, or the like. The minus-side wire end 26b drawn out from the inner side of the drive coil 26 is electrically connected to the minus-side pattern using solder, a conductive adhesive, or the like.

The one surface 27a of the flexible wiring circuit board 27 is electrically connected to the plate spring 36 which is overlapped with the flexible wiring circuit board 27 on the reception portion 24 of the lens holding member 21.

The shape of the drive coil 26 and the flexible wiring circuit board 27 is not limited to a rectangle discussed above, and may be a polygon such as a triangle, a quadrangle, a pentagon, and a hexagon.

In contrast to a lens barrel according to the related art, the lens barrel 11 does not use a coil holder made of a resin to electrically connect the drive coil 26 and the plate spring 36. Rather, the lens barrel 11 uses the flexible wiring circuit board 27 which is thinner than the coil holder in place of the coil holder, which contributes to reducing the overall height.

(3-4. Plate Spring)

As shown in FIG. 4, the plate spring 36 is paired with a plate spring 55 attached to the front barrel 51, and is formed from a metal material with elasticity and conductivity such as beryllium copper. The plate spring 36 is composed of a first spring 37 and a second spring 38 divided from each other for electrical separation. The first spring 37 is electrically connected to the plus-side pattern on the one surface 27a of the flexible wiring circuit board 27. The second spring 38 is electrically connected to the minus-side pattern on the one surface 27a of the flexible wiring circuit board 27.

The first spring 37 and the second spring 38 respectively include elastic support portions 37a and 38a that elastically support the lens holding member 21 to which the drive coil 26 is attached. The elastic support portions 37a and 38a are respectively formed integrally with positioning pieces 37b and 38b for positioning with respect to the rear barrel 41. Positioning holes 37c and 38c are respectively formed in the positioning pieces 37b and 38b. The elastic support portions 37a and 38a are also respectively formed integrally with terminal pieces 37d and 38d that are continuous with the positioning pieces 37b and 38b on one side to supply power to the drive coil 26.

(3-5. Rear Barrel)

As shown in FIG. 5, the rear barrel 41 includes a generally rectangular bottom surface 42 and four side walls 42a, 42b, 42c, and 42d. A generally rectangular opening 45 that faces to the imaging element 72 is formed in the center of the bottom surface 42. Support portions 43a, 43b, 43c, and 43d are formed at respective corner portions of the bottom surface 42. Support projections 49 that support a base 21a of the lens holding member 21 are formed in the vicinity of the support portions 43a, 43b, 43c, and 43d of the bottom surface 42.

Positioning projections 44a, 44b, 44c, and 44d to be engaged with the positioning holes 37c and 38c respectively formed in the positioning pieces 37b and 38b of the first and second springs 37 and 38 are respectively formed on top of the support portions 43a, 43b, 43c, and 43d. The support portions 43a and 43c support the first spring 37 by engaging the positioning holes 37c of the first spring 37 with the positioning projections 44a and 44c. Meanwhile, the support portions 43b and 43d support the second spring 38 by engaging the positioning holes 38c of the second spring 38 with the positioning projections 44b and 44d.

The side walls 42a and 42b are respectively formed with positioning recesses 46a and 46b to be engaged with side plates of a cover member 61 attached to cover the entire front barrel 51 from above. Meanwhile, the side walls 42c and 42d are respectively formed with engagement projections 47a and 47b to be engaged with the other side plates of the cover member 61.

(3-6. Front Barrel)

Figure 3:
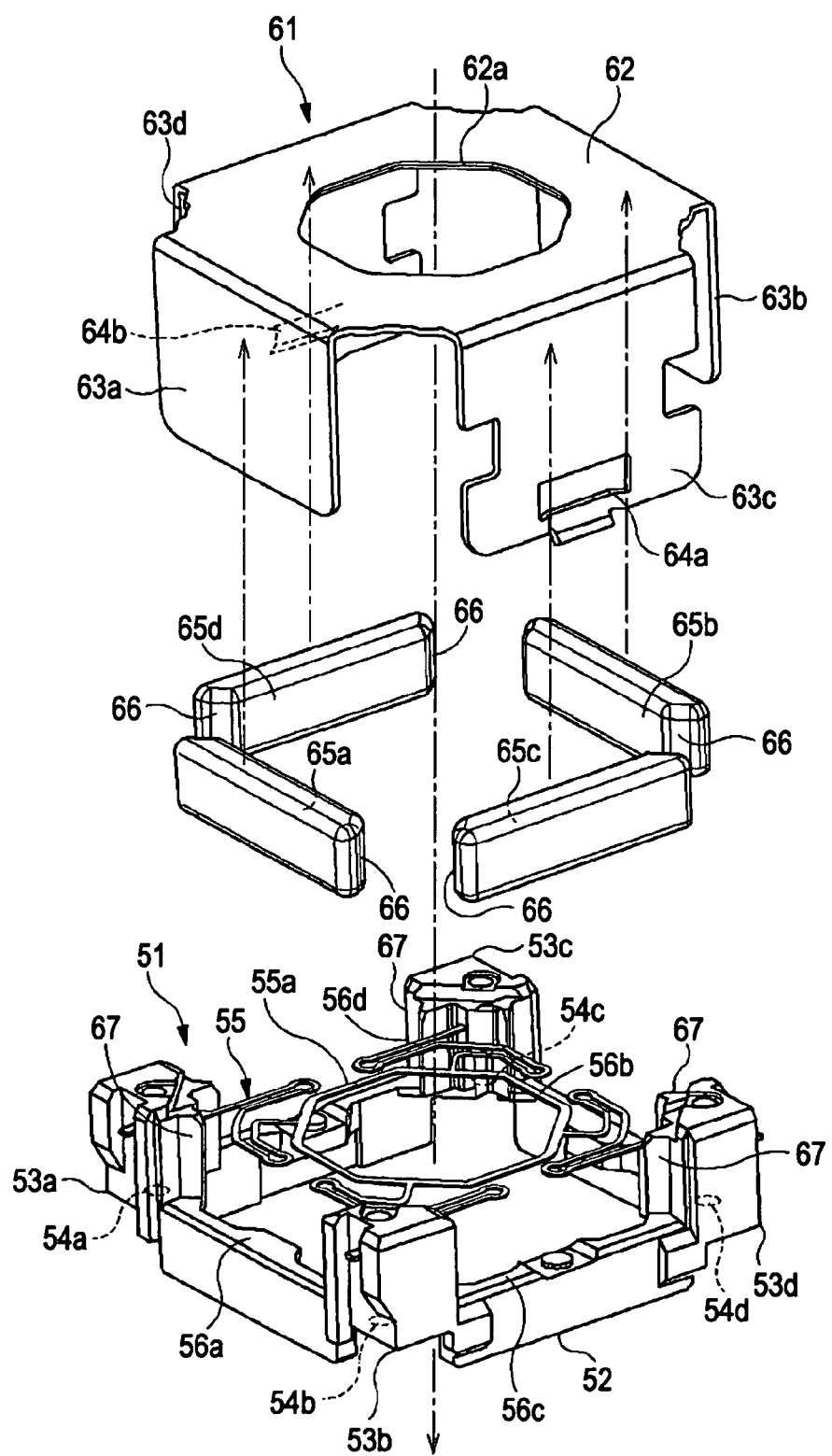
FIG. 3 is a perspective view showing a cover member, magnets, and a front barrel.

As shown in FIG. 3, the front barrel 51 is paired with the rear barrel 41, and the lens holding member 21 and so forth are disposed inside the front barrel 51. The front barrel 51 has a frame body 52 in generally the same rectangular shape as the bottom surface 42 of the rear barrel 41. Support portions 53a, 53b, 53c, and 53d that respectively face the support portions 43a, 43b, 43c, and 43d of the rear barrel 41 are formed at respective corner portions of the frame body 52. Positioning recesses 54a, 54b, 54c, and 54d to be respectively engaged with the support projections 44a, 44b, 44c, and 44d are respectively formed in the bottom surface of the support portions 53a, 53b, 53c, and 53d.

The plate spring 55, which is paired with the plate spring 36 which includes the first spring 37 and the second spring 38 discussed above, is attached to the front barrel 51. Specifically, the plate spring 55 is attached to the support portions 53a, 53b, 53c, and 53d by insert molding. The plate spring 55 is formed from a metal material with high elasticity such as beryllium copper. The plate spring 55 is disposed around the first cylindrical portion 22 of the lens holding member 21, and the inner peripheral portion of the plate spring 55 serves as an elastic support portion 55a. When the rear barrel 41 and the front barrel 51 are assembled to each other, the plate spring 55 is brought into abutment with abutment portions 25 formed around the first cylindrical portion 22 of the lens holding member 21. This allows the lens holding member 21 to be elastically supported by being sandwiched between the plate spring 55 and the first and second springs 37 and 38 forming the plate spring 36, which makes the lens holding member 21 movable in the optical-axis direction.

Areas between the support portions 53a, 53b, 53c, and 53d serve as magnet placement portions 56a, 56b, 56c, and 56d in which magnets attached to the cover member 61 are disposed.

(3-7. Cover Member)

As shown in FIG. 3, the cover member 61 includes a main surface 62 and side plates 63a, 63b, 63c, and 63d formed along the four sides of the main surface 62. The cover member 61 is formed by bending a magnetic metal plate. Specifically, the cover member 61 is formed from a ferritic stainless spring steel with high corrosion resistance such as NK43FS-H270. The cover member 61 may be formed from a magnetic metal plate such as SUS 430.

The main surface 62 is formed with a lens opening 62a through which the first lens 20a on the light incident side of the lens holding member 21 faces to the outside.

The side plates 63a, 63b, 63c, and 63d are respectively engaged with the positioning recesses 46a, 46b, 46c, and 46d of the rear barrel 41 when the rear barrel 41 and the front barrel 51 are assembled to each other. The side plates 63c and 63d are respectively formed with engagement holes 64a and 64b to be engaged with the engagement projections 47a and 47b of the rear barrel 41. The cover member 61 thus integrates the rear barrel 41 and the front barrel 51 with each other.

Figure 8:
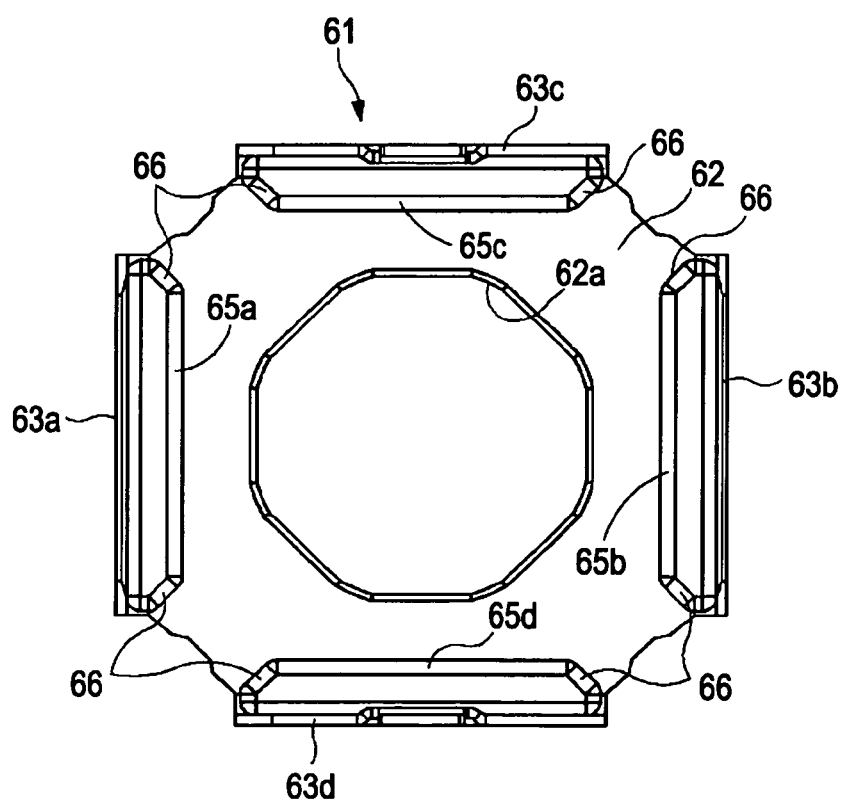
FIG. 8 is a bottom view of the cover member to which the magnets are attached.
Figure 9:
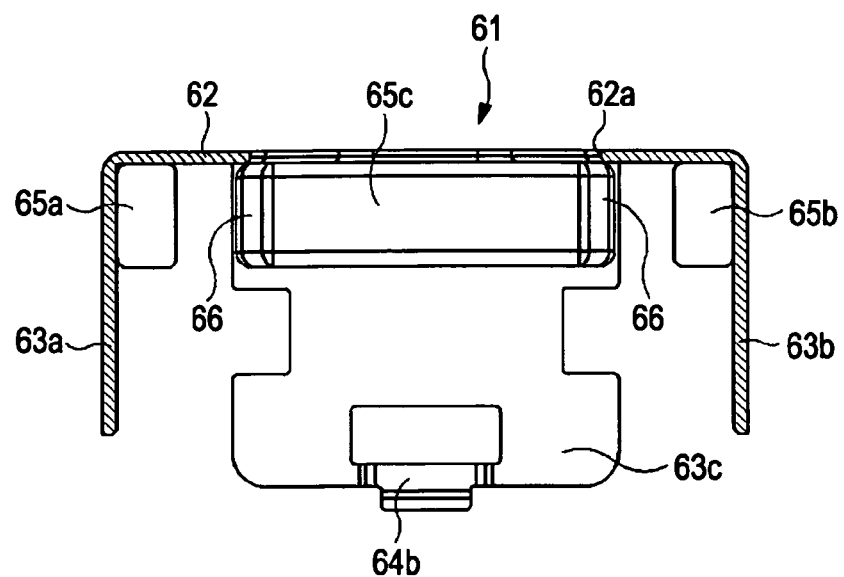
FIG. 9 is a cross-sectional view of the cover member to which the magnets are attached.

As shown in FIGS. 8 and 9, magnets 65a, 65b, 65c, and 65d are directly attached to the respective back surfaces of the side plates 63a, 63b, 63c, and 63d to face the drive coil 26. That is, the cover member 61 is formed from a magnetic metal plate. The magnets 65a, 65b, 65c, and 65d are attached to the respective back surfaces of the side plates 63a, 63b, 63c, and 63d through magnetic attraction. Specifically, the magnets 65a, 65b, 65c, and 65d are attached to respective corner portions formed between the main surface 62 and the side plates 63a, 63b, 63c, and 63d. Thus, the magnets 65a, 65b, 65c, and 65d are respectively positioned and attached at predetermined positions by moving the magnets 65a, 65b, 65c, and 65d along the side plates 63a, 63b, 63c, and 63d until the magnets 65a, 65b, 65c, and 65d are brought into abutment with the main surface 62.

The magnets 65a, 65b, 65c, and 65d may be respectively attached to the side plates 63a, 63b, 63c, and 63d only through magnetic attraction, or may be fixed using an adhesive.

When the cover member 61 is attached to the rear barrel 41 and the front barrel 51 with the magnets 65a, 65b, 65c, and 65d respectively attached to the side plates 63a, 63b, 63c, and 63d, the magnets 65a, 65b, 65c, and 65d are respectively disposed in the magnet placement portions 56a, 56b, 56c, and 56d of the front barrel 51. In this state, the magnets 65a, 65b, 65c, and 65d face the drive coil 26. The cover member 61 is formed from a magnetic metal plate, and also functions as a yoke. Since the cover member 61 is formed from a magnetic material, the lens barrel 11 does not employ a yoke which is used in the related art, which contributes to reducing the size and the weight. In addition, since the lens barrel 11 does not employ a yoke, it is possible to increase the size of the magnets 65a, 65b, 65c, and 65d and hence the drive force of a voice coil motor.

Figure 10:
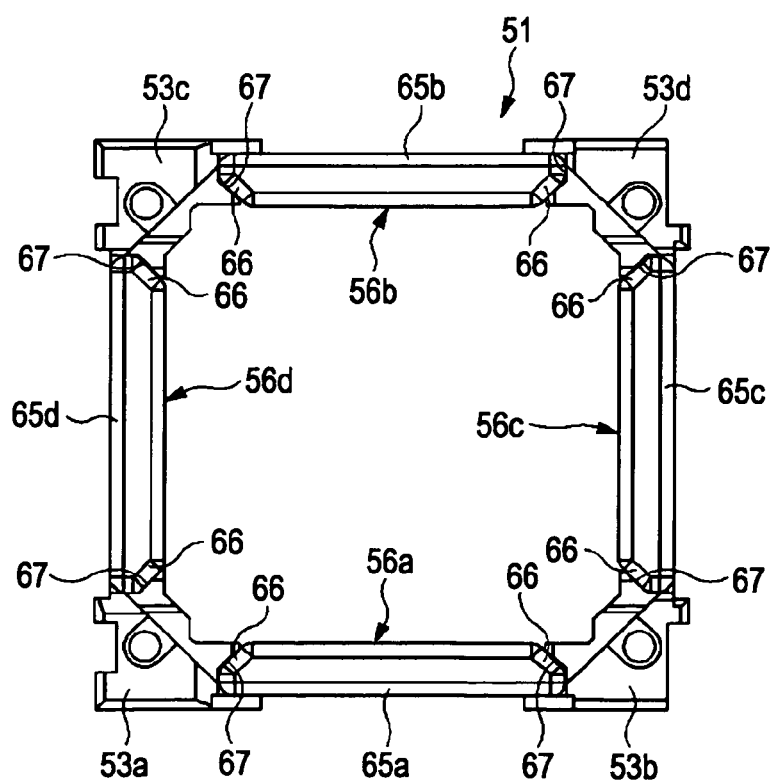
FIG. 10 is a plan view showing the positional relationship between the front barrel and the magnets.
Figure 11:
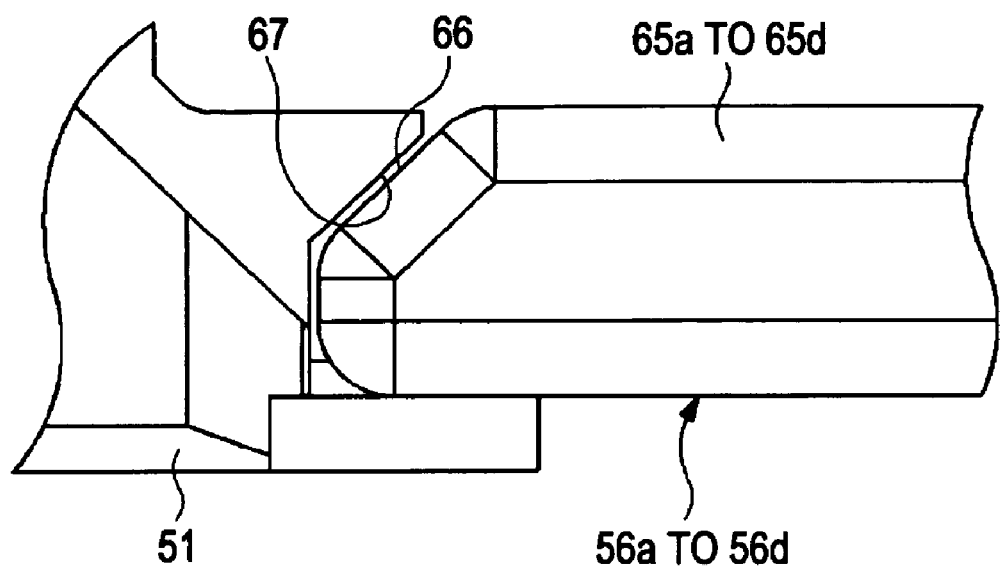
FIG. 11 is an enlarged plan view showing the relationship between a magnet and a magnet placement portion.

As shown in FIGS. 10 and 11, surfaces of the magnets 65a, 65b, 65c, and 65d that face the drive coil 26 are formed to be smaller than the opposite surfaces, with inclined surfaces 66 formed on both sides of the shorter side. That is, the magnets 65a, 65b, 65c, and 65d are formed to have a trapezoidal cross section. Meanwhile, position regulation portions 67, which are inclined surfaces corresponding to the inclined surfaces 66, are formed in the magnet placement portions 56a, 56b, 56c, and 56d of the front barrel 51. Even if the magnets 65a, 65b, 65c, and 65d respectively attached to the side plates 63a, 63b, 63c, 63d through magnetic attraction as discussed above are displaced from or come out of the predetermined positions because of a shock or the like, the inclined surfaces 66 abut against the position regulation portions 67. Thus, the magnets 65a, 65b, 65c, and 65d are prevented from colliding against the drive coil 26, which faces the magnets 65a, 65b, 65c, and 65d, to damage the drive coil 26.

The inclined surfaces 66 of the magnets 65a, 65b, 65c, and 65d may be formed to have an arcuate surface or a stepped shape. Also, the position regulation portions 67 are not limited to inclined surfaces, and may be formed to have any shape that corresponds to the shape of the inclined surfaces 66. The surfaces of the magnets 65a, 65b, 65c, and 65d that face the drive coil 26 may be positioned outwardly or inwardly of the inner surface of the front barrel 51.

The cover member 61 also has a function of preventing viewing the inside from the circumference of the lens facing to the outside when the lens barrel 11 is installed in an electronic device.

(4. Imaging Element Portion)

As shown in FIG. 5, the imaging element portion 12 to which the lens barrel 11 configured as described above is attached includes the printed wiring circuit board 71 and the imaging element 72 mounted on the printed wiring circuit board 71.

The printed wiring circuit board 71 may be a rigid glass epoxy substrate, for example, and the imaging element 72 is mounted on a mount portion in which a plurality of lands are provided. A frame 73 formed from a ceramic or the like is provided around the imaging element 72. The frame 73 protects the imaging element 72 inside.

An insulation layer of the printed wiring circuit board 71 may be formed from epoxy or other organic materials such as a polyimide resin (PI resin), a bismaleimide-triazine resin (BT resin), and a polyphenylene ether resin (PPE resin) resin which form a thermosetting resin film, and a liquid crystal polymer (LCP), a polyether ether ketone resin (PEEK resin), a polyetherimide resin (PEI resin), and a polyether sulfone resin (PES resin) which form a thermoplastic resin film.

The frame 73 may be omitted. In this case, a member replacing the frame 73 may be provided around the opening 45 of the rear barrel 41 with the member in abutment with the circumference of the imaging element 72 on the printed wiring circuit board 71, for example.

An electronic component 74 such as a drive IC that activates the camera module 10 is mounted on the printed wiring circuit board 71. In addition to activating the camera module 10, the electronic component 74 supplies power to the drive coil 26. Power supply lands 75 are formed on the printed wiring circuit board 71 in the vicinity of the imaging element 72. The terminal piece 37d of the first spring 37 and the terminal piece 38d of the second spring 38, which form the plate spring 36 and which are electrically connected to the drive coil 26 discussed above via the flexible wiring circuit board 27, are electrically connected to the power supply lands 75 using a conductive adhesive 76 or the like.

(5. Assembly of Camera Module)

Assembly of the camera module 10 will be described. As shown in FIG. 7, the other surface 27b, which is formed with an insulation layer, of the flexible wiring circuit board 27 is bonded to the lower surface of the drive coil 26 using an adhesive or the like. The plus-side wire end 26a led out from the inner side of the drive coil 26 is drawn to the one surface 27a of the flexible wiring circuit board 27, and is electrically connected using solder, a conductive adhesive, or the like. Also, the minus-side wire end 26b led out from the inner side of the drive coil 26 is drawn to the one surface 27a of the flexible wiring circuit board 27, and is electrically connected using solder, a conductive adhesive, or the like.

Figure 12:
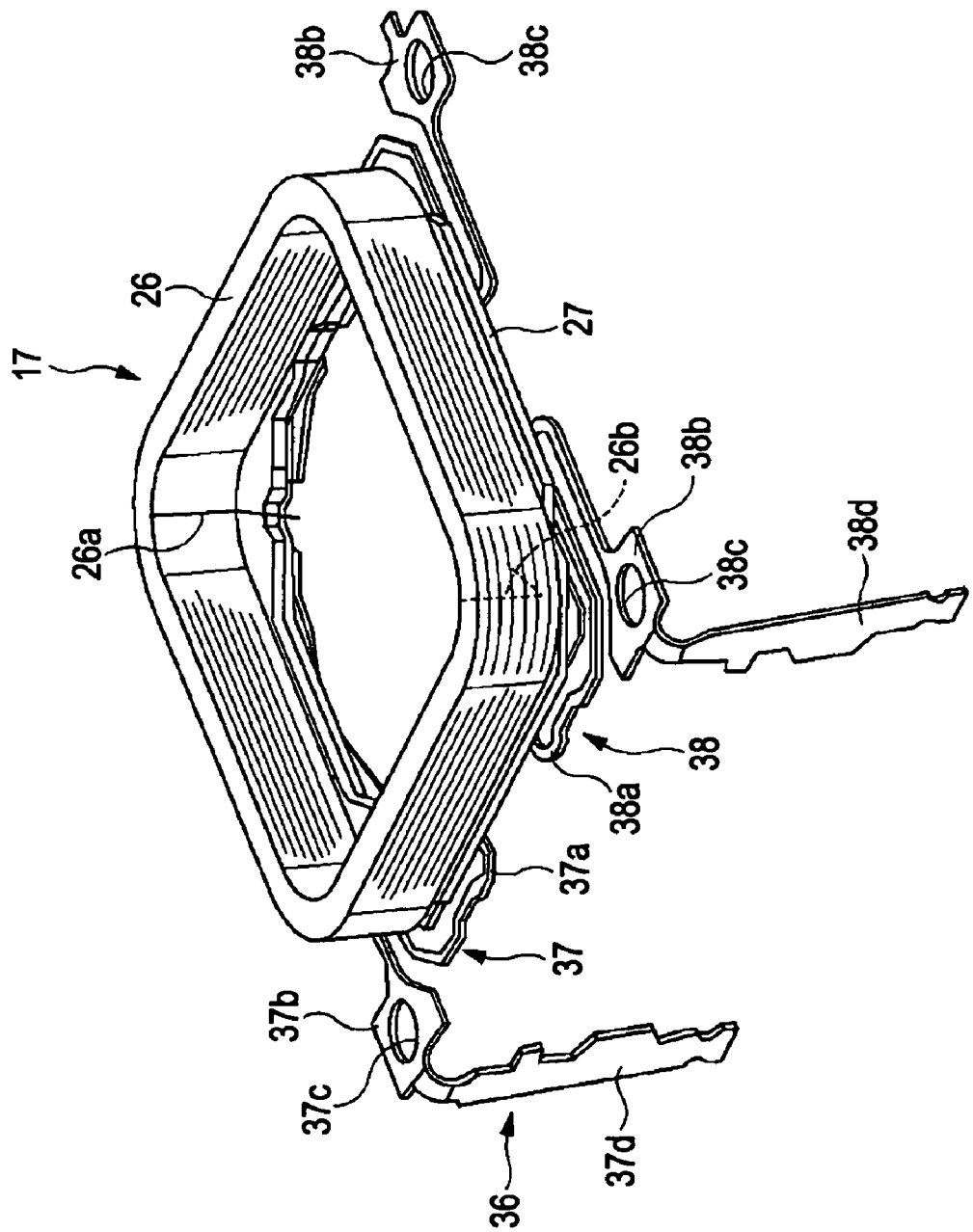
FIG. 12 is a perspective view of a second assembly obtained by assembling first and second springs serving as the plate spring to a first assembly composed of the drive coil and the flexible wiring circuit board.

Then, as shown in FIG. 12, the first spring 37 and the second spring 38 forming the plate spring 36 are overlapped with a first assembly 16, which is composed of the drive coil 26 and the flexible wiring circuit board 27, for electrical connection.

The flexible wiring circuit board 27 and the plate spring 36 and the second spring 37 may further be fixed to each other using an adhesive, or may be not fixed to each other because they will be sandwiched between the lens holding member 21 and the drive coil 26.

Figure 13:
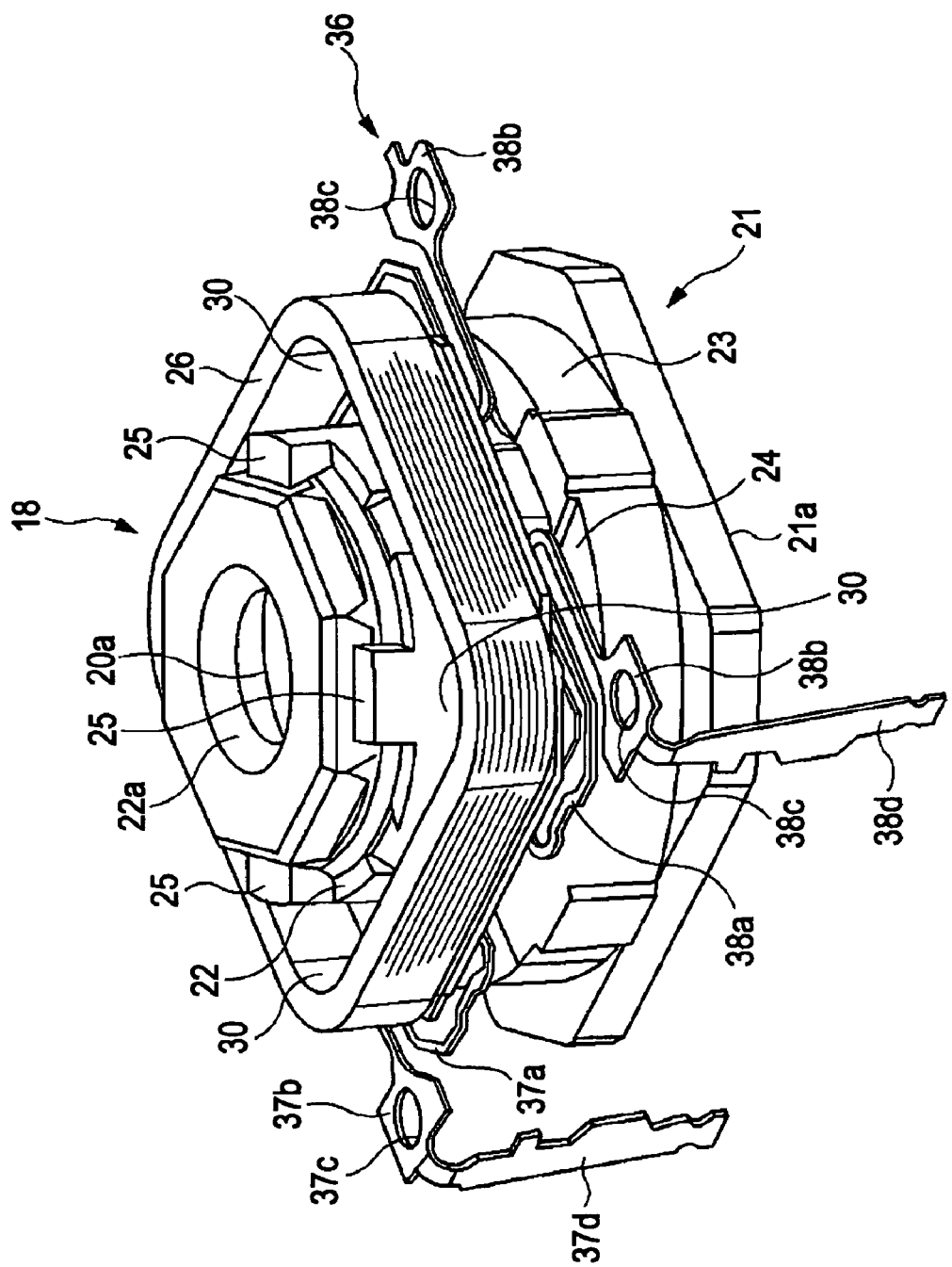
FIG. 13 is a perspective view of a third assembly obtained by attaching the lens holding member to the second assembly.

As shown in FIG. 13, a second assembly 17 obtained by assembling the first and second springs 37 and 38 forming the plate spring 36 to the first assembly 16 composed of the drive coil 26 and the flexible wiring circuit board 27 is assembled to the lens holding member 21. Specifically, the first cylindrical portion 22 of the lens holding member 21 is inserted into the second assembly 17 so that the second assembly 17 is supported by the reception portion 24. Thus, the voids 30 through which the plus-side wire end 26a and the minus-side wire end 26b of the drive coil 26 extend are formed between the first cylindrical portion 22 with a generally circular cross section and the drive coil 26 in a generally rectangular shape. An adhesive is injected from the voids 30 to integrate the lens holding member 21 and the second assembly 17 with each other. That is, the drive coil 26, the flexible wiring circuit board 27, and the plate spring 36 are integrated with the lens holding member 21.

The adhesive injected from the voids 30 flows into voids between the drive coil 26 and the first cylindrical portion 22 of the lens holding member 21, and thus is not necessarily injected from corner portions of the drive coil 26. That is, the adhesive may be injected into a void, if any, between corner portions of the drive coil 26.

Figure 14:
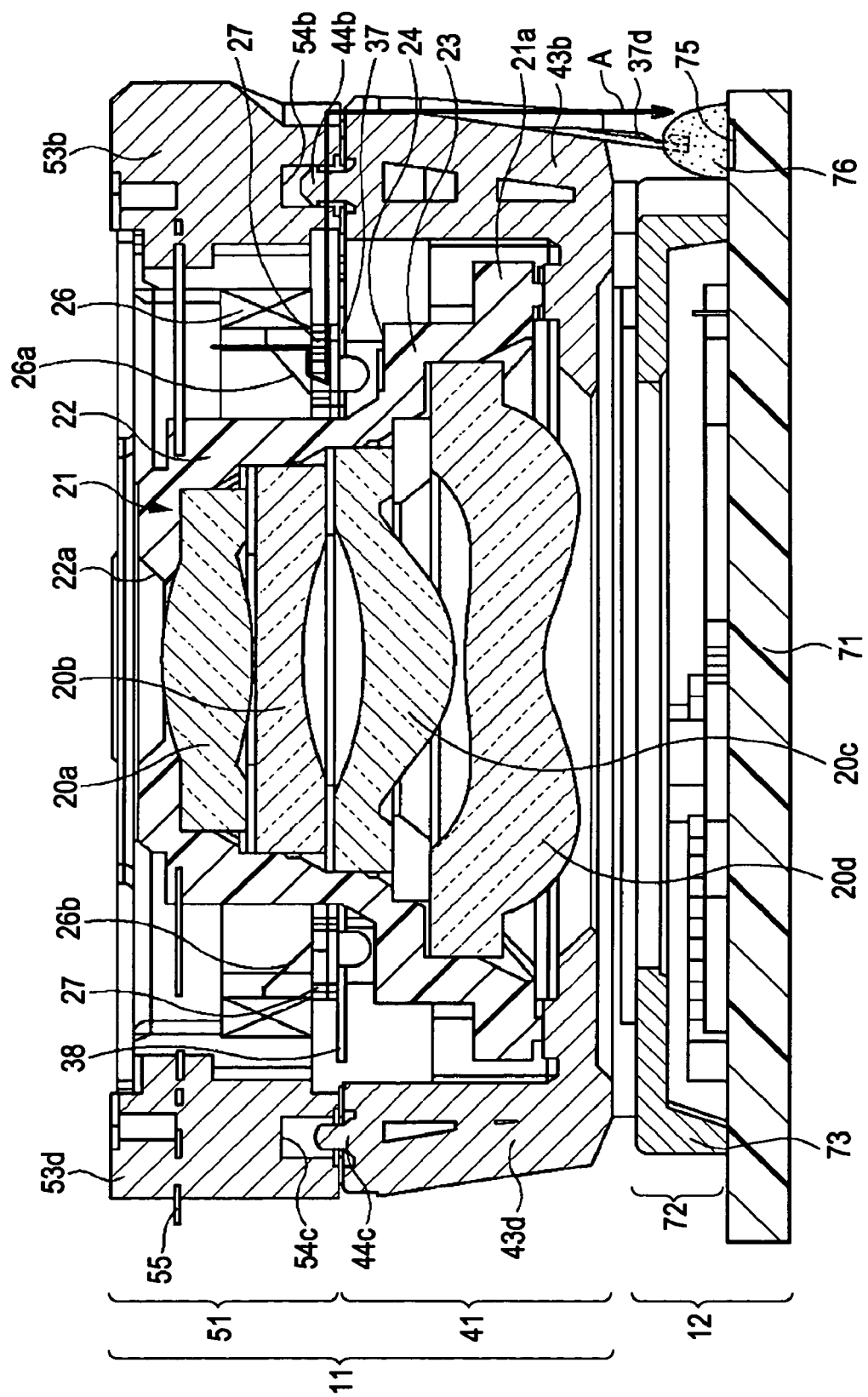
FIG. 14 is a cross-sectional view taken along the line XIV-XIV of FIG. 2.

Then, in a third assembly 18 obtained by fixing the lens holding member 21 to the second assembly 17, as shown in FIG. 13, the terminal piece 37d of the first spring 37 and the terminal piece 38d of the second spring 38 are bent at approximately 90 degrees. Specifically, the terminal pieces 37d and 38d are respectively bent along the support portions 43a and 43b of the rear barrel 41 such that respective ends of the terminal pieces 37d and 38d are in the proximity of the frame 73 around the imaging element 72. Then, the third assembly 18 is attached to the rear barrel 41. Specifically, as shown in FIGS. 5 and 14, the third assembly 18 is positioned by respectively engaging the positioning holes 37c and 38c of the first and second springs 37 and 38 with the positioning projections 44a, 44b, 44c, and 44d of the rear barrel 41.

The terminal pieces 37d and 38d may be bent in advance before being electrically connected to the flexible wiring circuit board 27.

Then, the front barrel 51 is attached to the rear barrel 41 to which the third assembly 18 is attached. Specifically, the front barrel 51 into which the plate spring 55 is inserted is attached to the rear barrel 41 by respectively engaging the positioning recesses 54a, 54b, 54c, and 54b of the support portions 53a, 53b, 53c, and 53d with the positioning projections 44a, 44b, 44c, and 44d engaged with the positioning holes 37c and 38c of the first and second springs 37 and 38.

Figure 15:
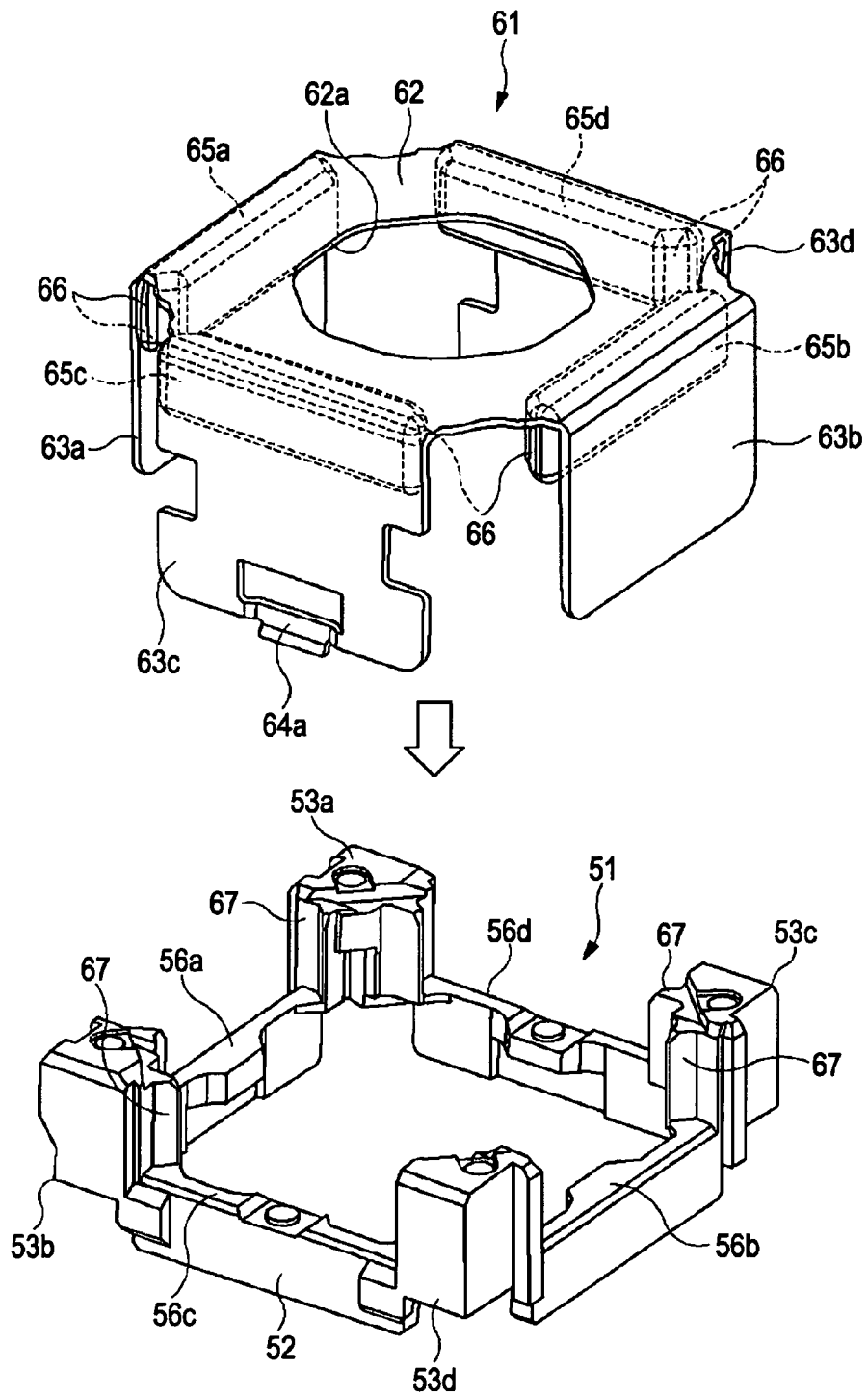
FIG. 15 is a perspective view showing a state in which the cover member provided with the magnets is attached to the front barrel.

Meanwhile, as shown in FIGS. 8 and 15, the magnets 65a, 65b, 65c, and 65d are respectively positioned and attached to the side plates 63a, 63b, 63c, and 63d by bringing the magnets 65a, 65b, 65c, and 65d into abutment with the main surface 62. After that, as shown in FIGS. 2 to 5, the cover member 61 is attached to cover an area from the front barrel 51 to the rear barrel 41. Specifically, the side plates 63a, 63b, 63c, and 63d of the cover member 61 are respectively engaged with the positioning recesses 46a, 46b, 46c, and 46d of the rear barrel 41. Also, the engagement projections 47a and 47b of the rear barrel 41 are respectively engaged with the engagement holes 64a and 64b of the side plates 63c and 63d. The cover member 61 thus integrates the rear barrel 41 and the front barrel 51 with each other.

Figure 16:
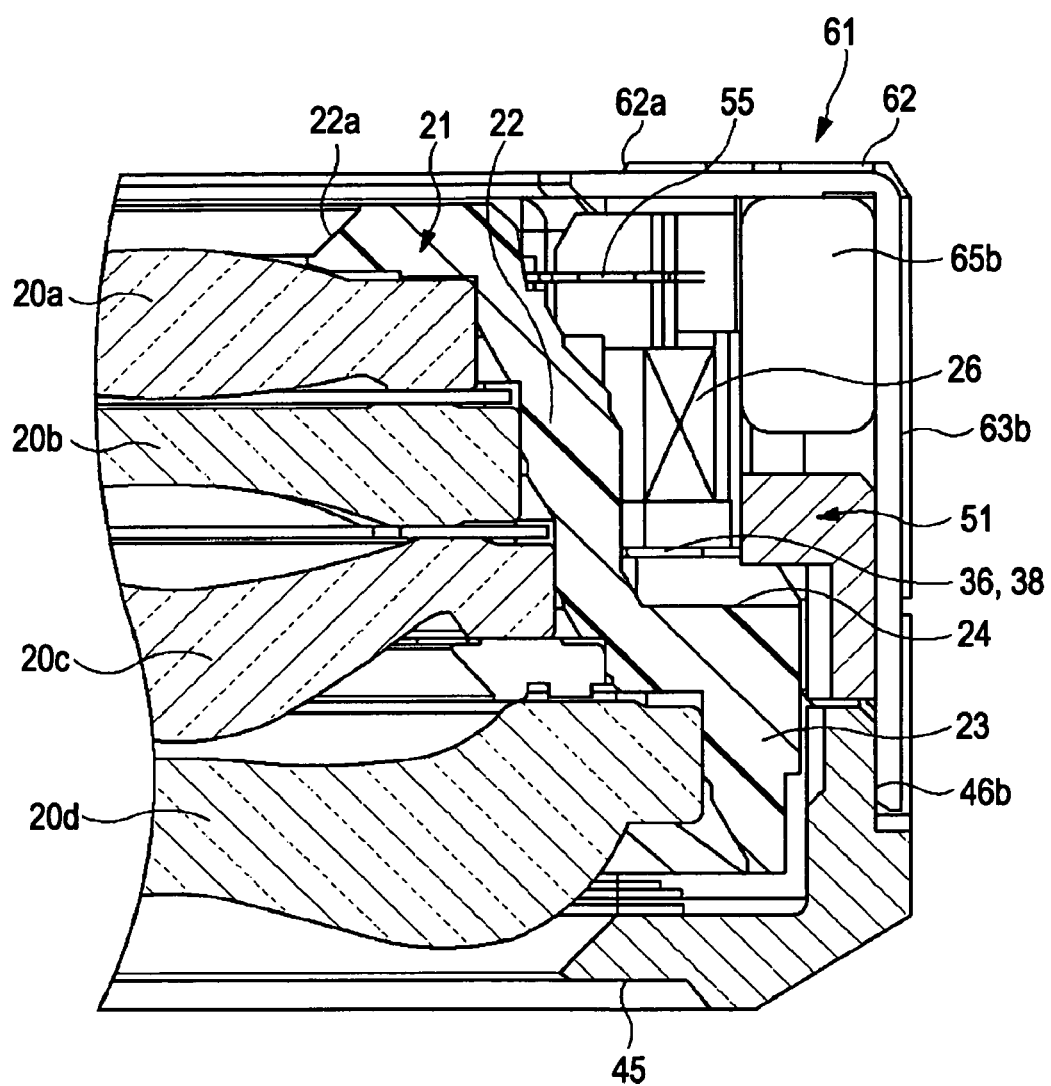
FIG. 16 is a cross-sectional view showing the positional relationship between the magnets and the drive coil.

Thus, as shown in FIGS. 10, 11, and 16, the magnets 65a, 65b, 65c, and 65d respectively attached to the side plates 63a, 63b, 63c, and 63d of the cover member 61 are respectively disposed in the magnet placement portions 56a, 56b, 56c, and 56d of the front barrel 51. This allows the magnets 65a, 65b, 65c, and 65d to face the drive coil 26. The cover member 61 to which the magnets 65a, 65b, 65c, and 65d are directly attached is magnetic, and thus functions as a yoke.

In the lens barrel 11 configured as described above, as shown in FIG. 14, the first and second springs 37 and 38 are sandwiched between the reception portion 24 of the lens holding member 21 and the drive coil 26 via the flexible wiring circuit board 27. Thus, the lens holding member 21 is integrated with the first and second springs 37 and 38 of the plate spring 36. The first and second springs 37 and 38 of the plate spring 36 are sandwiched between the rear barrel 41 and the front barrel 51. The plate spring 55 of the front barrel 51 is brought into abutment with the abutment portions 25 formed around the first cylindrical portion 22 of the lens holding member 21. That is, the lens holding member 21 is sandwiched between the plate springs 36 and 55 to be elastically supported by the rear barrel 41 and the front barrel 51 through the plate springs 36 and 55.

In the lens barrel 11, the drive coil 26 attached to the lens holding member 21 on the movable side and the magnets 65a, 65b, 65c, and 65d attached to the cover member 61 on the fixed side form a voice coil motor serving as a focus drive section.

As shown in FIGS. 5 and 14, the lens barrel 11 configured as described above is installed on the printed wiring circuit board 71 on which the imaging element 72 is mounted. Specifically, the terminal piece 37d of the first spring 37 and the terminal piece 38d of the second spring 38, which form the plate spring 36 and which are electrically connected to the drive coil 26 via the flexible wiring circuit board 27, are electrically connected to the power supply lands 75 using the conductive adhesive 76 or the like. A predetermined current is thus supplied from a power source circuit on the printed wiring circuit board 71 to the drive coil 26 forming a voice coil motor serving as the focus drive section.

The camera module 10 is thus completed by attaching the lens barrel 11 to the printed wiring circuit board 71. After that, the camera module 10 is installed in a small electronic device such as a cellular phone.

(6. Operation of Camera Module)

A voice coil motor serving as the focus drive section is incorporated in the camera module 10 assembled as described above to achieve the focus function. That is, in the focus drive section, when a drive current is supplied to the drive coil 26 in one direction, the drive current and the magnetic field produced by the magnets 65a, 65b, 65c, and 65d act to move the lens holding member 21 to the light incident side along the optical axis. Meanwhile, when a drive current is supplied to the drive coil 26 in the other direction, the drive current and the magnetic field produced by the magnets 65a, 65b, 65c, and 65d act to move the lens holding member 21 to the light output side along the optical axis. The camera module 10 thus achieves the auto-focus function.

(7. Effect of Camera Module)

In the camera module 10 configured as described above, as shown in FIG. 14, the drive coil 26 forming a voice coil motor is disposed around the first cylindrical portion 22, which has a small diameter, of the lens holding member 21. Thus, even in the case where the number of pixels of the imaging element 72 is increased and the number of lenses is increased, for example by adding the fourth lens 20d, to increase the size of the lens holding member 21, it is possible to prevent the entire lens barrel 11 from becoming larger for the drive coil 26.

As shown in FIG. 7, the plus-side wire end 26a and the minus-side wire end 26b are drawn out from the inner side of the drive coil 26 to be electrically connected to the flexible wiring circuit board 27. Thus, it is possible to reduce the size of the drive coil 26 itself. In contrast to a lens barrel according to the related art, the lens barrel 11 does not use a coil holder made of a resin, but uses the flexible wiring circuit board 27, which is thinner than the coil holder made of a resin, to electrically connect the drive coil 26 and the plate spring 36 with each other, which contributes to reducing the overall height.

That is, it is possible to reduce the overall size of the lens barrel 11 while increasing the number of pixels of the imaging element 72, which naturally tends to increase the size of the lens holding member 21.

The cover member 61 is formed from a magnetic metal plate, and also functions as a yoke. Since the cover member 61 is formed from a magnetic material, the lens barrel 11 does not employ a yoke which is used in the related art, which contributes to reducing the size, the weight, and the cost. In addition, since the lens barrel 11 does not employ a yoke, it is possible to increase the size of the magnets 65a, 65b, 65c, and 65d and hence the drive force of a voice coil motor.

Even if the magnets 65a, 65b, 65c, and 65d respectively attached to the side plates 63a, 63b, 63c, 63d through magnetic attraction are displaced from or come out of the predetermined positions because of a shock or the like, the inclined surfaces 66 abut against the position regulation portions 67. Thus, the magnets 65a, 65b, 65c, and 65d are prevented from colliding against the drive coil 26, which faces the magnets 65a, 65b, 65c, and 65d, to damage the drive coil 26.

(8. Modifications)

While the camera module 10 is attached to the cellular phone 1 in the example described above, the camera module 10 according to the present invention may be installed in various portable electronic devices. In the lens barrel 11 described above, the first cylindrical portion 22 of the lens holding member 21 is generally cylindrical, and the drive coil 26 is generally rectangular. However, the present invention is not limited thereto. That is, the first cylindrical portion is not limited to having a generally circular cross section, and may have a polygonal cross section. The drive coil 26 is also not limited to having a generally rectangular shape, and may have a polygonal shape.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
   a lens holding member that holds a plurality of lenses including at least a first lens and a rear lens, in which the rear lens is the lens of the plurality of lenses located furthest away from the first lens;
   a drive coil attached to an outer peripheral portion of the lens holding member;
   a magnet attached to face the drive coil;
   a barrel member in which the lens holding member is disposed;
   a cover member attached to the barrel member such that the first lens of the plurality of lenses on a light incident side of the lens holding member faces to an outside,
   wherein the cover member is magnetic, and the magnet is directly attached to the cover member at a position facing the drive coil,
   wherein a diameter of the rear lens is larger than that of the first lens,
   wherein the outer peripheral portion of the lens holding member to which the drive coil is attached is configured such that at least a part of the drive coil attached thereto is inward of an outer periphery of the rear lens.

2. The lens barrel according to claim 1,
   wherein the barrel member is formed with a position regulation portion that is engaged with the magnet directly attached to the cover member at a position facing the drive coil to regulate the position of the magnet.

3. A lens barrel comprising:
   a lens holding member that holds a lens;
   a drive coil attached to an outer peripheral portion of the lens holding member;
   a magnet attached to face the drive coil;
   a barrel member in which the lens holding member is disposed; and
   a cover member attached to the barrel member with the lens on a light incident side of the lens holding member facing to an outside,
   wherein the cover member is magnetic, and the magnet is directly attached to the cover member at a position facing the drive coil,
   wherein the barrel member is formed with a position regulation portion that is engaged with the magnet directly attached to the cover member at a position facing the drive coil to regulate the position of the magnet, and
   wherein the cover member includes a top plate with an opening through which the lens on the light incident side of the lens holding member faces to the outside, and a side plate bent with respect to the top plate, and the magnet is directly attached to the side plate with the magnet in abutment with the top plate.

4. The lens barrel according to claim 3, wherein the magnet is positioned outwardly of an inner surface of the barrel member.

5. A camera module comprising:

A lens holding member that holds a plurality of lenses including at least a first lens and a rear lens, in which the rear lens is the lens of the plurality of lenses located furthest away from the first lens;

a drive coil attached to an outer peripheral portion of the lens holding member;

a magnet attached to face the drive coil;

a barrel member in which the lens holding member is disposed;

a cover member attached to the barrel member such that the first lens of the plurality of lenses on a light incident side of the lens holding member faces to an outside, wherein the cover member is magnetic, and the magnet is directly attached to the cover member at a position facing the drive coil, wherein a diameter of the rear lens is larger than that of the first lens, wherein the outer peripheral portion of the lens holding member to which the drive coil is attached is configured such that at least a part of the drive coil attached thereto is inward of an outer periphery of the rear lens.

6. An imaging apparatus comprising:

a lens holding member that holds a plurality of lenses including at least a first lens and a rear lens, in which the rear lens is the lens of the plurality of lenses located furthest away from the first lens;

a drive coil attached to an outer peripheral portion of the lens holding member;

a magnet attached to face the drive coil;

a barrel member in which the lens holding member is disposed;

a cover member attached to the barrel member such that the first lens of the plurality of lenses on a light incident side of the lens holding member faces to an outside, imaging means for capturing a subject image obtained via the lens; and storage means for storing an imaging signal acquired by the imaging means, wherein the cover member is magnetic, and the magnet is directly attached to the cover member at a position facing the drive coil, wherein a diameter of the rear lens is larger than that of the first lens, wherein the outer peripheral portion of the lens holding member to which the drive coil is attached is configured such that at least a part of the drive coil attached thereto is inward of an outer periphery of the rear lens.

7. An imaging apparatus comprising:

a lens holding member that holds a plurality of lenses including at least a first lens and a rear lens, in which the rear lens is the lens of the plurality of lenses located furthest away from the first lens;

a drive coil attached to an outer peripheral portion of the lens holding member;

a magnet attached to face the drive coil;

a barrel member in which the lens holding member is disposed;

a cover member attached to the barrel member such that the first lens of the plurality of lenses on a light incident side of the lens holding member faces to an outside, an imaging unit configured to capture a subject image obtained via the lens; and a storage unit configured to store an imaging signal acquired by the imaging unit, wherein the cover member is magnetic, and the magnet is directly attached to the cover member at a position facing the drive coil, wherein a diameter of the rear lens is larger than that of the first lens, wherein the outer peripheral portion of the lens holding member to which the drive coil is attached is configured such that at least a part of the drive coil attached thereto is inward of an outer periphery of the rear lens.

\* \* \* \* \*